(12) United States Patent
Kennedy

(10) Patent No.: US 7,934,259 B1
(45) Date of Patent: Apr. 26, 2011

(54) STEALTH THREAT DETECTION

(75) Inventor: Mark Kennedy, Redondo Beach, CA (US)

(73) Assignee: Symantec Corporation, Mountain View, CA (US)

( * ) Notice: Subject to any disclaimer, the term of this patent is extended or adjusted under 35 U.S.C. 154(b) by 1548 days.

(21) Appl. No.: 11/290,235

(22) Filed: Nov. 29, 2005

(51) Int. Cl.
*G06B 12/16* (2006.01)
*G06F 11/00* (2006.01)
*G06F 12/14* (2006.01)
*G06F 12/16* (2006.01)

(52) U.S. Cl. .......................................... 726/24; 726/22

(58) Field of Classification Search ............... 726/22 –25
See application file for complete search history.

(56) References Cited

U.S. PATENT DOCUMENTS

| | | | | |
|---|---|---|---|---|
| 5,696,702 | A * | 12/1997 | Skinner et al. ................. | 702/186 |
| 5,740,370 | A * | 4/1998 | Battersby et al. .............. | 709/219 |
| 5,838,262 | A * | 11/1998 | Kershner et al. .............. | 340/945 |
| 5,991,856 | A * | 11/1999 | Spilo et al. .................... | 711/147 |
| 6,088,803 | A | 7/2000 | Tso et al. | |
| 6,272,519 | B1 * | 8/2001 | Shearer et al. ................. | 718/104 |
| 6,314,409 | B2 | 11/2001 | Schneck | |
| 6,728,964 | B1 * | 4/2004 | Butt .............................. | 719/313 |
| 6,782,527 | B1 * | 8/2004 | Kouznetsov et al. ......... | 717/103 |
| 6,928,553 | B2 | 8/2005 | Xiong et al. | |
| 7,207,061 | B2 * | 4/2007 | Martin ........................... | 726/11 |
| 2002/0083343 | A1 | 6/2002 | Crosbie | |
| 2002/0087882 | A1 | 7/2002 | Schneier et al. | |
| 2002/0157020 | A1 | 10/2002 | Royer | |
| 2003/0037251 | A1 | 2/2003 | Frieder | |
| 2003/0051026 | A1 | 3/2003 | Carter | |
| 2006/0282827 | A1 * | 12/2006 | Yeap et al. .................... | 717/130 |

FOREIGN PATENT DOCUMENTS

WO WO 01/71499 A1 9/2001

OTHER PUBLICATIONS

Lee, Sin Yeung; Low, Wai Lup and Wong, Pei Yuen, "Learning Fingerprints for a Database Intrusion Detection System", Computer Security Laboratory, DSO National Labortories, Singapore, ESORICS Nov. 2002, LNCS 2502, pp. 264-279.
Low, Wai Lup, et al., "DIDAFIT: Detecting Intrusions in Databases Through Fingerprinting Transactions," ICEIS 2002, Fourth International Conference On Enterprise Information Systems, vol. 1, Apr. 3-6, 2002, pp. 121-128, Ciudad Real, Spain.

(Continued)

*Primary Examiner* — Kambiz Zand
*Assistant Examiner* — Dant B Shaifer Harriman
(74) *Attorney, Agent, or Firm* — Fenwick & West LLP

(57) ABSTRACT

A stealth threat detection manager detects stealth threats. The stealth threat detection manager monitors system activities that are vulnerable to being used by stealth threats. Dynamic link libraries are often used by stealth threats, so in some embodiments the stealth threat detection manager monitors for the loading thereof. The stealth threat detection manager detects when a system activity being monitored occurs, and after the occurrence of the activity, determines whether a specific component associated with the activity (e.g., the dynamic link library being loaded) is accessible on the computer. If the component is accessible, the stealth threat detection manager concludes that the component is non-stealthed. On the other hand, if the component is not accessible, the stealth threat detection manager concludes that the component is a stealth threat, and takes appropriate action in response.

16 Claims, 1 Drawing Sheet

OTHER PUBLICATIONS

Change log for Analysis Console for Intrusion Detection (Acid), indicating release date of Sep. 8, 2000 [online]. Andrew.cmu.edu [retrieved Apr. 18, 2003]. Retrieved from the Internet: <URL: http://www.andrew.cmu.edu/~rdanyliw/snort/CHANGELOG>, U.S.A.

AirCERT web page, last updated Sep. 18, 2000 [online]. Cert.org [retrieved Apr. 18, 2003]. Retrieved from the Internet: <URL: http://www.cert.org/kb/aircert/>, U.S.A.

Analysis Console For Intrusion Detection (ACID) web page [online]. Andrew.cmu.edu [retrieved Apr. 18, 2003]. Retrieved from the Internet: <URL: http://www.andrew.cmu.edu/~rdanyliw/snort/snortacid.html>, U.S.A.

Schneier, Bruce, Managed Security Monitoring: Network Security for the 21st Century, 2001 [online]. Counterpane.com [retrieved Apr. 18, 2003]. Retrieved from the Internet: <URL: http://www.counterpane.com/msm.pdf>, U.S.A.

Web page, announcing Nov. 11, 2000 release of Dshield [online]. Deja.com [retrieved Apr. 18, 2003]. Retrieved from the Internet: >URL: http://groups.google.com/groups?selm=8vm48v%245pd%241%40nnrp1.deja.com&oe=UTF-8&output=gplain>, U.S.A.

e=Security, Inc., Correlation Technology for Security Event Management, Oct. 7, 2002 [online]. eSecurityins.com [retrieved Apr. 18, 2003]. Retrieved from the Internet: >URL: http://www.esecurityinc.com/downloads/Correlation_WP.pdf>, Vienna, VA.

MyNetWatchman.com web pages indicating 9/00 beta release [online]. MyNetWatchman.com [retrieved Apr. 18, 2003]. Retrieved from the Internet: <URL: http://www.mynetwatchman.com/mynetwatchman/relnotes.htm>, Alpharetta, GA.

2000 Review of eSecurity product on Network Security web page [online]. SCMagazine.com [retrieved Apr. 18, 2003]. Retrieved from the Internet: <URL: http://www.scmagazine.com/scmagazine/2000_12/testc/network.htm#Open>.

"Caltarian Security Technology Platform", Riptech web pages [online]. Symantec.com [retrieved Apr. 18, 2003]. Retrieved from the Internet: <URL: http://enterprisesecurity.symantec.com/Content/displayPDF.cfm?SSSPDFID=35&EID=O>, U.S.A.

Slashdot.org web pages describing Dshield, dated Nov. 27, 2000 [online]. Slashdot.org [retrieved Apr. 18, 2003]. Retrieved from the Internet: <URL: http://slashdot.org/article.pl?sid=00/11/27/1957238&mode=thread>, U.S.A.

Chung, C., Gertz, M., and Levitt, K., "DEMIDS: A Misuse Detection System for Database Systems," Department of Computer Science, University of California at Davis, Oct. 1, 1999, pp. 1-18.

SCIP Product, Microdasys—"The need to control, inspect and manage encrypted webtraffic."[online]. Retrieved on Mar. 18, 2005. Retrieved from the Internet: <URL: http://www.microdasys.com/scipproduct+M54a708de802.html>. Author unknown, 2 pages, Czech Republic.

Microdasys, "S C I P Secured Content Inspection: Protecting the Enterprise from CryptoHacks," 2003 by Microdasys Inc., 2 pages, Czech Republic.

Marketing, "Digital Certificates—Best Practices—A Microdasys Whitepaper," bestpractice.doc, Revision 1.1 (Jul. 31, 2003), 6 pages, Czech Republic.

Network Computing Solutions—"Microdasys SCIP" [online]. Retrieved on Mar. 18, 2005. Retrieved from the Internet: <URL: http://www.ncs.cz/index.php?language=en&menuitem-4&subitem=13>, 2 pages, Czech Republic.

Network Computing Solutions—NSC Homepage—News [online]. Retrieved on Mar. 18, 2005. Retrieved from the Internet: <URL:// http://www.nsc.cz/index.php?language=en&menuitem=0&subitem=4&subitem=13>, 3 pages, Czech Republic.

"SSL Stripper Installation Guide," [online]. Retrieved in Mar. 2005 from the Internet: <URL: http://www.sslstripper.com>, 2 pages, U.S.A.

SSL Stripper Home Page, "Security Solutions: SSL Stripper," [online]. Retrieved on Mar. 18, 2005. Retrieved from the Internet: <URL: http://www.vroyer.org/sslstripper/index.html>, 2 pages, Oct. 15, 2004, U.S.A.

SSL Stripper Sample Screenshots, "Security Solutions: Sample Screenshots," [online]. Retrieved on Mar. 18, 2005. Retrieved from the Internet: <URL: http://www.vroyer.org/sslstripper/screenshots.html>, 3 pages, Oct. 15, 2004, U.S.A.

Webwasher AG/Full feature set, "Full feature set," [online]. Retrieved on Mar. 18, 2005. Retrieved from the Internet: <URL: http://www.webwasher.com/enterprise/products/webwasher_products/ssl_scanner/full_feature_set..html?I...>, 2 pages.

Webwasher AG/Webwasher 1000 CSM Appliance, "Webwasher 1000 CSM Appliance," [online]. Retrieved on Mar. 18, 2005. Retrieved from the Internet: <URL: http://www.webwasher.com/enterprise/products/webwasher_products/csm_appliance/index...> 2 pages.

Webwasher AG/Webwasher URL Filter, "Webwasher URL Filter," [online]. Retrieved on Mar. 18, 2005. Retrieved from the Internet: <URL: http://www.webwasher.com/enterprise/products/webwasher_products/webwasher_url_filter..> 1 page.

Webwasher AG/Webwasher Anti Virus, "Webwasher Anti Virus," [online]. Retrieved on Mar. 18, 2005. Retrieved from the Internet: <URL: http://www.webwasher.com/enterprise/products/webwasher_products/anti_virus/index.html...>, 2 pages.

Webwasher AG/Webwasher Anti Spam, "Webwasher Anti Spam," [online]. Retrieved on Mar. 18, 2005. Retrieved from the Internet: <URL: http://www.webwasher.com/enterprise/products/webwasher_products/anti_spam/index.htm...>, 1 page.

Webwasher AG/Webwasher Content Protection, "Webwasher Content Protection," [online]. Retrieved on Mar. 18, 2005. Retrieved from the Internet: <URL: http://www.webwasher.com/enterprise/products/webwasher_products/content_protection/index.html>, 2 pages.

Webwasher AG/Webwasher SSL Scanner, "Webwasher SSL Scanner," [online]. Retrieved on Mar. 18, 2005. Retrieved from the Internet: <URL: http://www.webwasher.com/enterprise/products/webwasher_products/ssl_scanner/index.html>, 2 pages.

CyberGuard Corporation, "CyberGuard and Webwasher: The Value Proposition," A CyberGuard Corporation White Paper, May 2004, 6 pages.

* cited by examiner

STEALTH THREAT DETECTION

TECHNICAL FIELD

This invention pertains generally to computer security, and more specifically to detecting stealth threats.

BACKGROUND

Stealthing is a growing trend in malicious code. Stealthed threats use various techniques to hide their presence on a computer, such as making the software component that they infect or in which they reside invisible to user mode processes. This makes it more difficult to detect (and thus neutralize) stealthed malicious code. Being able to detect and thus counteract stealth threats is clearly desirable. What is needed are methods, systems and computer readable media for detecting stealth threats.

SUMMARY OF INVENTION

Computer-implemented methods, computer systems and computer-readable media detect stealth threats. A stealth threat detection manager monitors system activities that are vulnerable to being used by stealth threats. The monitoring can be performed, for example, by intercepting system calls that perform the activity. Drivers and dynamic link libraries (DLLs) are often used by stealth threats, so in some embodiments the stealth threat detection manager monitors for the installation of drivers and/or the loading of DDLs. The stealth threat detection manager detects when a system activity being monitored occurs, and after the occurrence of the activity, determines whether a specific component associated with the activity is accessible on the computer. For example, in an embodiment in which the loading of DLLs is being monitored, after a DLL has been loaded, the stealth threat detection manager determines whether a process can still view that DLL. If the component in question is accessible (for example, to a user level process), the stealth threat detection manager concludes that the component is non-stealthed. On the other hand, if the component is not accessible, the stealth threat detection manager concludes that the component is a stealth threat, and takes appropriate action in response.

The features and advantages described in this summary and in the following detailed description are not all-inclusive, and particularly, many additional features and advantages will be apparent to one of ordinary skill in the relevant art in view of the drawing, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

Figure 1:
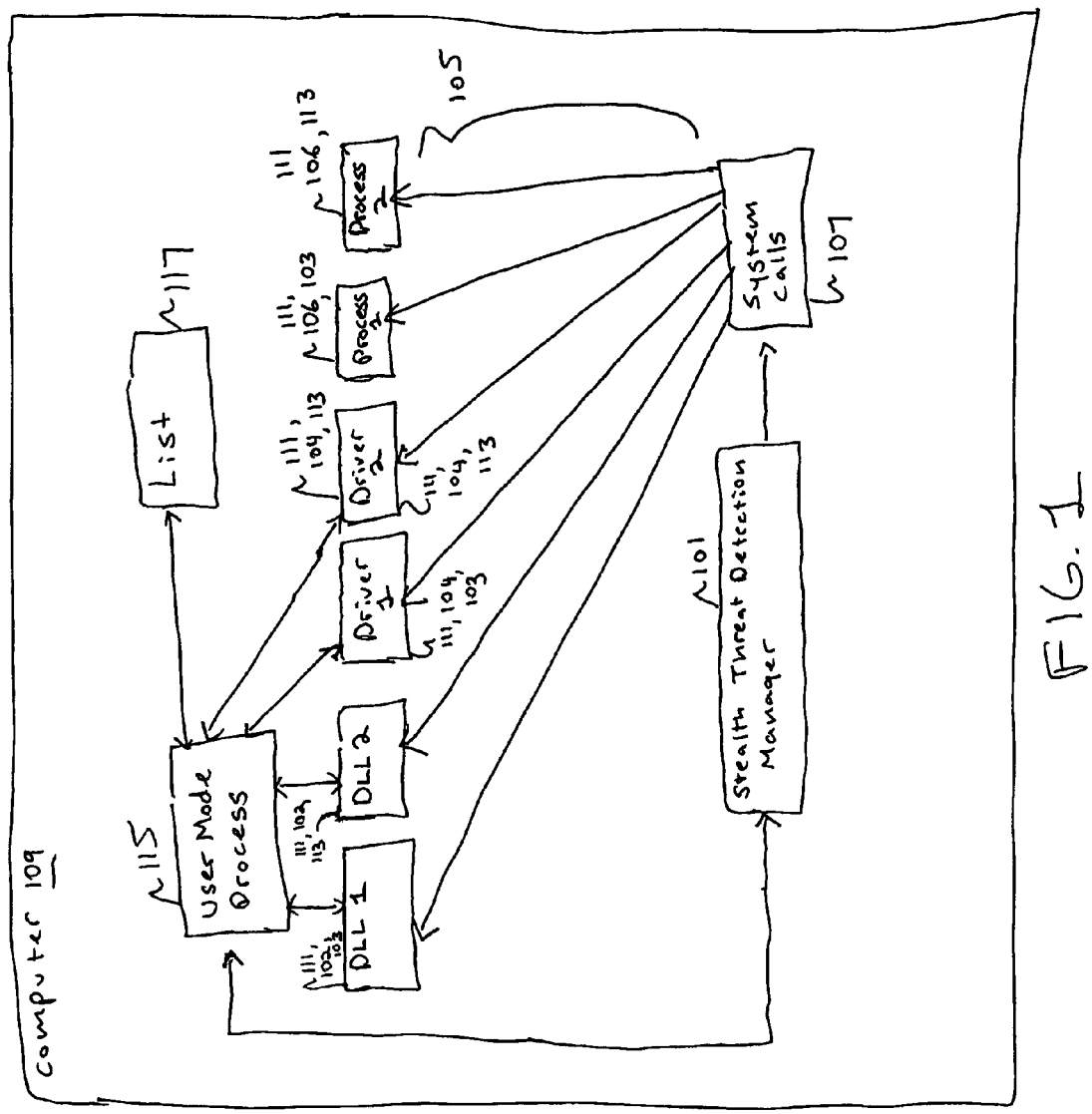
FIG. 1 is a block diagram illustrating a high level overview of a stealth threat detection manager detecting stealth threats on a computer, according to some embodiments of the present invention.

The FIGURE depicts embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

FIG. 1 illustrates a stealth threat detection manager 101 detecting stealth threats 103, according to some embodiments of the present invention. It is to be understood that although the stealth threat detection manager 101 is illustrated as a single entity, as the term is used herein a stealth threat detection manager 101 refers to a collection of functionalities which can be implemented as software, hardware, firmware or any combination of these. Where a stealth threat detection manager 101 is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, the stealth threat detection manager 101 detects stealth threats 103 by monitoring for the occurrence of a system activity 105 which is known to be vulnerable to being hijacked by stealth threats 103. For example, stealth threats 103 often install themselves as dynamic link libraries (DLLs 102), so in one embodiment of the present invention, the stealth threat detection manager 101 monitors the loading of DLLs 102. Stealth threats 103 also frequently use drivers 104 and processes 106, so in other embodiments the stealth threat detection manager 101 detects installation of drivers 104 and/or loading of processes 106. Additional and/or other system activities 105 are monitored in other embodiments as desired.

Typically, the stealth threat detection manager 101 monitors system activities 105 of interest by intercepting system calls 107 responsible for those activities 105. In other embodiments, other techniques can be utilized, such as watching for the access of system resources at a kernel level, or the use of a file system filter driver (not illustrated). The implementation mechanics of intercepting system calls 107 and employing other system activity monitoring techniques are known to those of ordinary skill in the art of operating system programming, and their use within the context of the present invention will be readily apparent to those of such a skill level in light of this specification.

Through the monitoring process, the stealth threat detection manager 101 detects when a system activity 105 of interest is occurring on a computer 109. The stealth threat detection manager 101 allows the activity 105 to occur. After the occurrence of the activity 105, the stealth threat detection manager 101 determines whether a specific component 111 associated with the activity 105 is accessible on the computer 109. The component 111 to check for is one in which a stealth threat 103 is suspected to be hiding. If the component 111 is no longer accessible after the activity 105 has occurred, then the stealth threat detection manager 101 concludes that the component 111 is in fact stealth 103. On the other hand, if the component 111 is still accessible, then the stealth threat detection manager 101 concludes that the component 111 is non-stealthed 113.

For example, in an embodiment in which the stealth threat detection manager 101 is monitoring the loading of DLLs, after allowing a DLL 102 to be loaded, the stealth threat detection manager 101 determines whether a process 115 (e.g., a process running in user mode as illustrated) can still view the loaded DLL 102. If the DLL 102 is no longer visible, the stealth threat detection manager 101 concludes that the DLL 102 is a stealth threat 103, whereas if the user mode process 115 can still access the DLL 102, the stealth threat detection manager 101 concludes that it is non-stealthed 113. Similarly, where the activity 105 being monitored is the installation of drivers 104, the stealth threat detection manager 101 makes its determination as to the status of the driver 104 based on whether or not it can still be accessed (e.g., by a user mode process 115) after the installation. In other embodiments, the detection can be at the kernel level, which would identify stealth threats in the form of kernel mode root kits and the like (not illustrated). It is to be understood that the user or kernel level process 115 can be a process queried by the stealth threat detection manager 101, or can be in the form of a user or kernel mode component of the stealth threat detection manager 101 itself.

In embodiments in which the stealth threat detection manager 101 is monitoring the loading of processes 106, after a process 106 has loaded, the stealth threat detection manager 101 (or an associated process 115) performs an enumeration of processes 106 active on the computer 107. If the loaded process 106 does not appear on the resulting list 117 of active processes 106, the stealth threat detection manager 101 concludes that the process 106 is a stealth threat 103. On the other hand, if the loaded process 106 appears on the list 117, then the stealth threat detection manager 101 concludes that it is non-stealthed 113.

Where the stealth threat detection manager 101 identifies a stealth threat 103, it can perform various actions in response, such as terminating the execution of the stealth threat 103, removing the component in question 111 and/or reporting the determination to another entity, such as a centralized security service (not illustrated).

As will be understood by those familiar with the art, the invention may be embodied in other specific forms without departing from the spirit or essential characteristics thereof. Likewise, the particular naming and division of the modules, agents, managers, functions, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, agents, managers, functions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for detecting stealth threats on a computer, the method comprising the steps of:
   detecting, by a stealth threat detection manager executing on the computer, that a system activity associated with installing or loading a software component is occurring on the computer;
   after the occurrence of the activity, determining whether the software component associated with the activity is accessible to the stealth threat detection manager executing on the computer; and
   determining whether the software component associated with the activity comprises a stealth threat, responsive to whether the software component is accessible to the stealth threat detection manager executing on the computer, wherein the software component is determined to comprise a stealth threat responsive to the software component not being accessible.

2. The method of claim 1 wherein the step of detecting the system activity further comprises:
   intercepting system calls that perform the activity.

3. The method of claim 1 wherein the system activity is one from a group of activities consisting of:
   installing a driver;
   loading a dynamic link library; and
   loading a process.

4. The method of claim 1 wherein the system activity comprises installing a driver and the step of determining whether the software component associated with the activity is accessible to the stealth threat detection manager executing on the computer further comprises:
   determining whether the stealth threat detection manager can view the installed driver, wherein the stealth threat detection manager determines that the installed driver is a stealth threat responsive to the stealth threat detection manager not being able to view the installed driver.

5. The method of claim 1 wherein the system activity comprises loading a dynamic link library and the step of determining whether the software component associated with the activity is accessible to the stealth threat detection manager executing on the computer further comprises:
   determining whether the stealth threat detection manager can view the dynamic link library, wherein the stealth threat detection manager determines that the dynamic link library is a stealth threat responsive to the stealth threat detection manager not being able to view the dynamic link library.

6. The method of claim 1 wherein the system activity comprises loading a process and the step of determining whether the software component associated with the activity is accessible to the stealth threat detection manager executing on the computer further comprises:
   enumerating processes active on the computer to produce a list of active processes; and
   determining, by the stealth threat detection manager, whether the loaded process appears on the list of active processes, wherein the stealth threat detection manager determines that the loaded process is a stealth threat responsive to the loaded process not appearing on the list of active processes.

7. The method of claim 1 wherein the step of determining whether the software component associated with the activity comprises a stealth threat responsive to whether the software component is accessible further comprises:
   responsive to the software component being accessible to the stealth threat detection manager, determining that the software component does not comprise a stealth threat.

8. The method of claim 1 further comprising, responsive to determining that the software component does comprise a stealth threat, performing at least one step from a group of steps consisting of:
   terminating execution of the software component;
   removing the software component; and
   reporting the determination to at least one other entity.

9. A non-transitory computer readable medium containing an executable computer program product for detecting stealth threats on a computer, the computer program product comprising:

program code for executing a stealth threat detection manager on the computer, the stealth threat detection manager adapted to detect that a system activity associated with installing or loading a software component is occurring on the computer;

program code for, after the occurrence of the activity, determining whether the software component associated with the activity is accessible to the stealth threat detection manager executing on the computer; and program code for determining whether the software component associated with the activity comprises a stealth threat, responsive to whether the software component is accessible to the stealth threat detection manager executing on the computer, wherein the software component is determined to comprise a stealth threat responsive to the software component not being accessible.

10. The non-transitory computer readable medium of claim 9 wherein:

the system activity comprises installation of a driver; and the program code for determining whether the software component associated with the activity is accessible to the stealth threat detection manager executing on the computer further comprises program code for determining whether the stealth threat detection manager can view the installed driver, wherein the stealth threat detection manager determines that the installed driver is a stealth threat responsive to the stealth threat detection manager not being able to view the installed driver.

11. The non-transitory computer readable medium of claim 9 wherein:

the system activity comprises loading of a dynamic link library; and the program code for determining whether the software component associated with the activity is accessible to the stealth threat detection manager executing on the computer further comprises program code for determining whether the stealth threat detection manager can view the loaded dynamic link library, wherein the stealth threat detection manager determines that the loaded dynamic link library is a stealth threat responsive to the stealth threat detection manager not being able to view the loaded dynamic link library.

12. The non-transitory computer readable medium of claim 9 wherein the program code for determining whether the software component associated with the activity comprises a stealth threat responsive to whether the software component is accessible further comprises:

program code for determining that the software component does not comprise a stealth threat, responsive to the software component being accessible to the stealth threat detection manager.

13. A computer system for detecting stealth threats on a computer, the computer system comprising:

a non-transitory computer readable medium containing an executable computer program product for detecting stealth threats on the computer, the computer program product comprising:

a software portion configured to execute a stealth threat detection manager on the computer, the stealth threat detection manager adapted to detect that a system activity associated with installing or loading a software component is occurring on the computer;

a software portion configured to determine whether the software component associated with the activity is accessible to the stealth threat detection manager executing on the computer, after the occurrence of the activity; and a software portion configured to determine whether the software component associated with the activity comprises a stealth threat, responsive to whether the software component is accessible to the stealth threat detection manager executing on the computer, wherein the software component is determined to comprise a stealth threat responsive to the software component not being accessible.

14. The computer system of claim 13 wherein:

the system activity comprises installation of a driver; and the software portion configured to determine whether the software component associated with the activity is accessible to the stealth threat detection manager executing on the computer is further configured to determine whether the stealth threat detection manager can view the installed driver, wherein the stealth threat detection manager determines that the installed driver is a stealth threat responsive to the stealth threat detection manager not being able to view the installed driver.

15. The computer system of claim 13 wherein:

the system activity comprises loading of a dynamic link library; and the software portion configured to determine whether the software component associated with the activity is accessible to the stealth threat detection manager executing on the computer is further configured to determine whether the stealth threat detection manager can view the loaded dynamic link library, wherein the stealth threat detection manager determines that the loaded dynamic link library is a stealth threat responsive to the stealth threat detection manager not being able to view the loaded dynamic link library.

16. The computer system of claim 13 wherein the software portion configured to determine whether the software component associated with the activity comprises a stealth threat responsive to whether the software component is accessible is further configured to:

determine that the software component does not comprise a stealth threat, responsive to the software component being accessible to the stealth threat detection manager.

* * * * *